Aug. 22, 1939. H. L. MYERS Re. 21,180
ROTARY DISK EDGING MACHINE
Original Filed Feb. 3, 1933 4 Sheets-Sheet 1
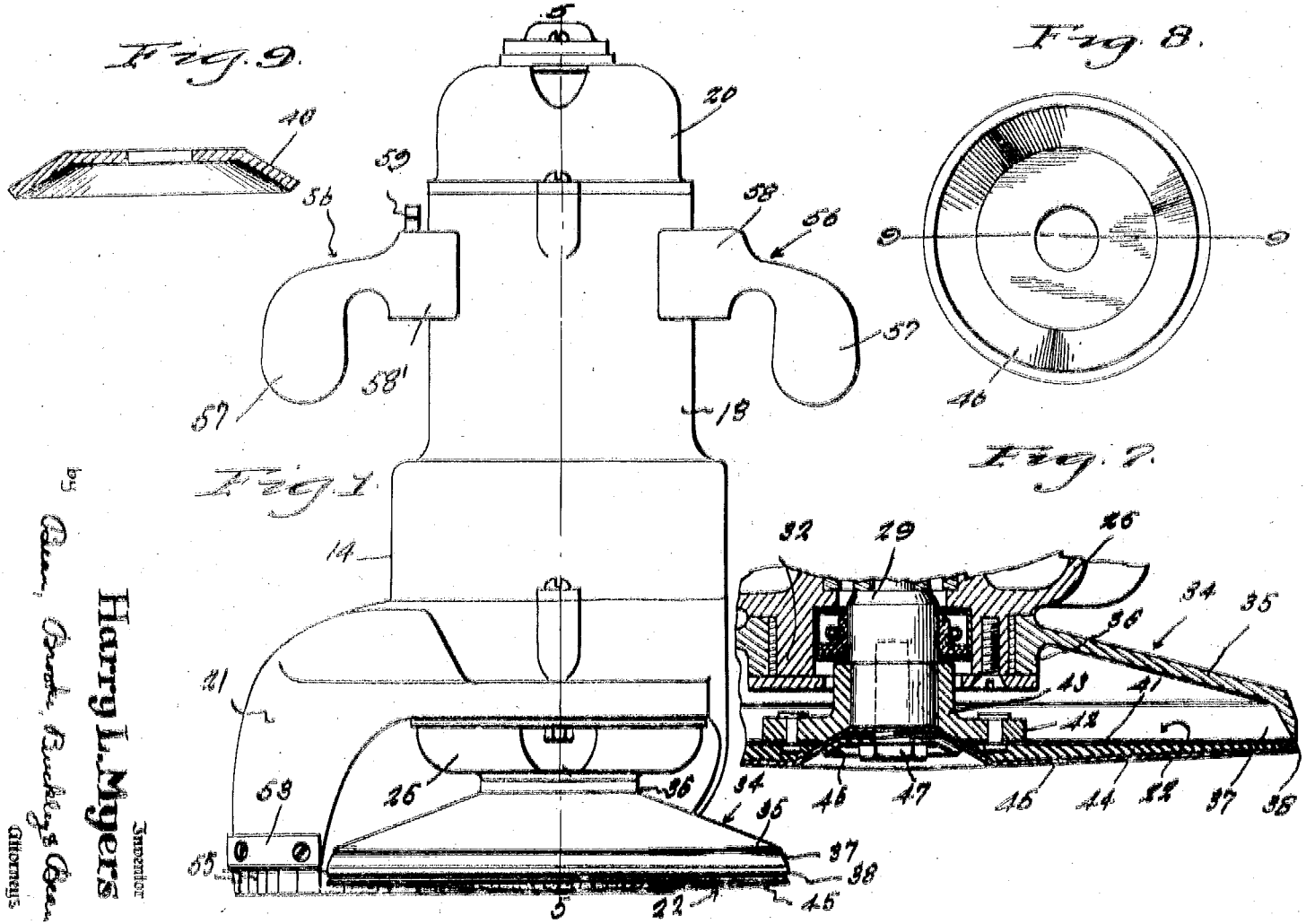
Inventor
Harry L. Myers
by Bean, Brooks, Buckley & Bean
Attorneys ROTARY DISK EDGING MACHINE
Original Filed Feb. 3, 1933 4 Sheets-Sheet 2
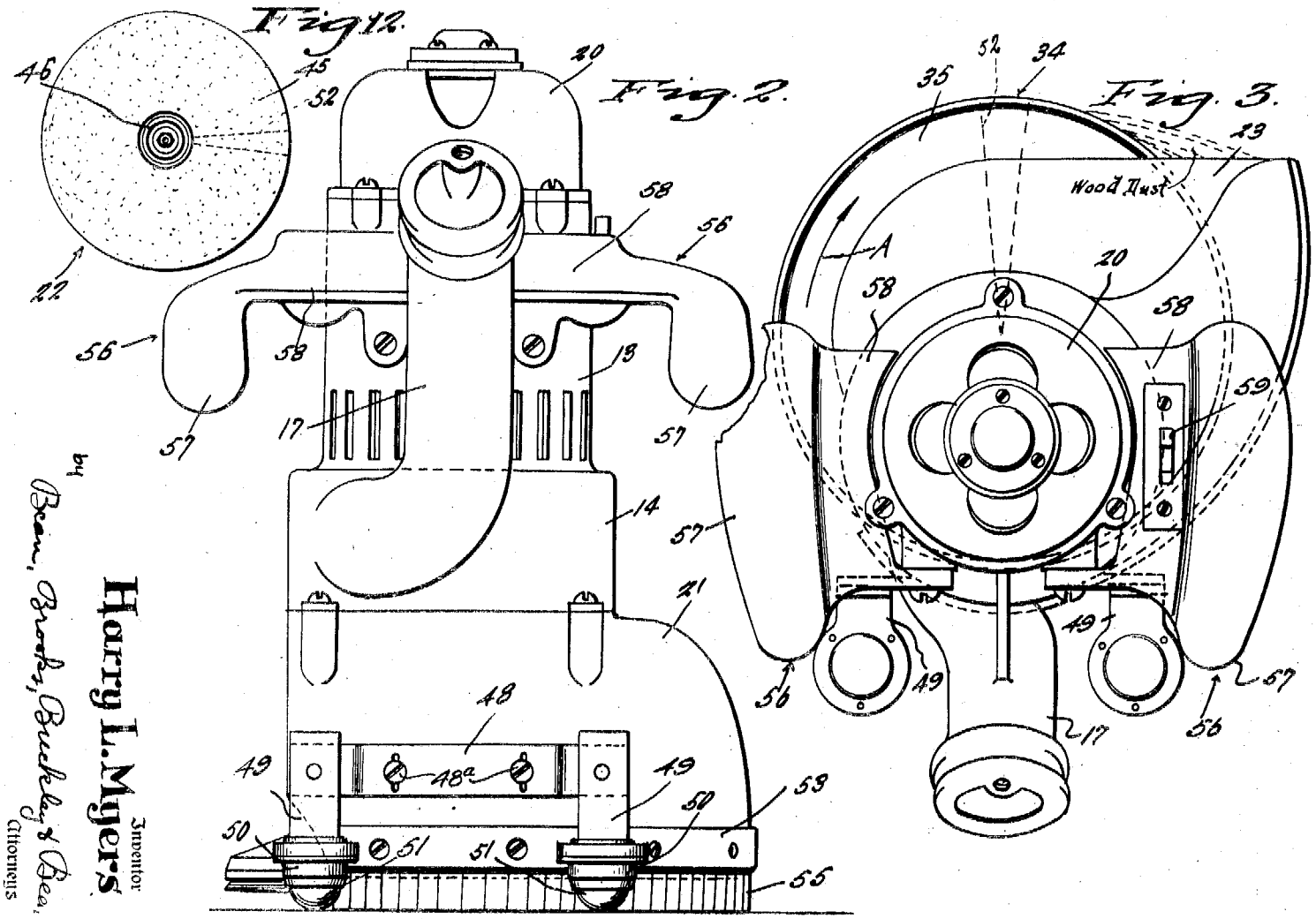
Inventor
Harry L. Myers
by
Bean, Brooks, Buckley & Bea,
Attorneys Aug. 22, 1939. H. L. MYERS Re. 21,180
ROTARY DISK EDGING MACHINE
Original Filed Feb. 3, 1933 4 Sheets-Sheet 3
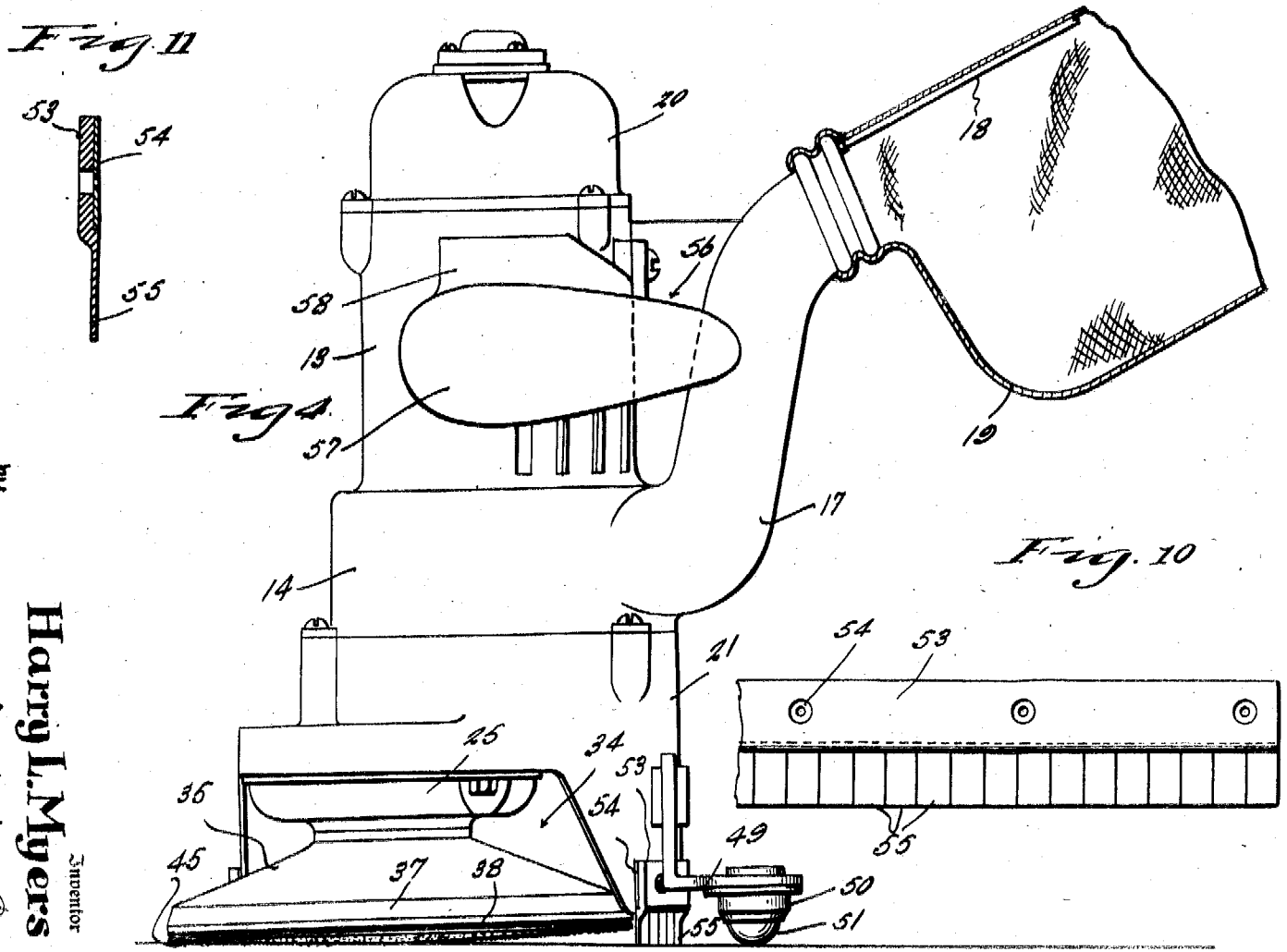
Inventor
Harry L. Myers
by Bean, Brooks, Buckley & Bean
Attorneys.

ROTARY DISK EDGING MACHINE

Original Filed Feb. 3, 1933 4 Sheets-Sheet 4

Inventor
Harry L. Myers
by
Bean, Brooks, Buckley & Bean
Attorneys

Reissued Aug. 22, 1939 Re. 21,180

UNITED STATES PATENT OFFICE 21,180

ROTARY DISK EDGING MACHINE

Harry L. Myers, Toledo, Ohio, assignor to The American Floor Surfacing Machine Company, Toledo, Ohio, a corporation of Ohio Original No. 1,951,105, dated March 13, 1934, Serial No. 655,106, February 3, 1933. Application for reissue February 14, 1936, Serial No. 63,939

14 Claims. (Cl. 51—177)

This invention relates to surface conditioning and finishing machines and processes, including floor finishing.

The objects of the present invention are to provide a power driven machine or tool of such weight and size and dimension and so designed and constructed as to enable it to be readily handled in different operating positions by an operator and utilized effectively to sand, abrade, or otherwise treat marginal portions of a floor or other surface in a minimum of time and with a minimum of expense and without danger of mutilating or marring the baseboard, shoe strip or other adjacent parts or surfaces and which will enable an operator to effectively and expeditiously treat, trim and finish panelling, stair treads, closet interiors, or exterior or interior surfaces of vats or other substantially inaccessible surfaces.

I have embodied my invention in a small readily portable, self-contained machine or tool of rugged and compact construction which is readily transportable and usable as a unit, and which includes a rotatable disk adapted to be disposed substantially co-planar with a floor or surface to be treated, to be operated at a relatively high speed, and provided with suitable surface treating material as an abrasive or the like, together with non-marring means for positioning the machine with relation to the surface to be treated so that momentarily only a portion of the rotating disk contacts with the surface under treatment. The device includes a guard member or buffer adapted to engage in non-marring contact with a baseboard or other surface angularly disposed with relation to the surface being treated to guide the machine or tool along the baseboard or other surface and to allow the rotatable disk to approach and operate upon the floor, or other surface being treated, to within a fraction of an inch of the baseboard or angularly disposed part or surface.

In the accompanying drawings:

Fig. 1 is a front elevation of a machine constructed in accordance with my invention;

Fig. 2 is a rear elevation thereof;

Fig. 3 is a top plan view;

Fig. 4 is a side elevation;

Fig. 7 is a fragmentary detail sectional view showing the means for holding the abrasive disk removably in place;

Figs. 8 and 9 are detail views of the abrasive disk clamping washer;

Figs. 10 and 11 are fragmentary elevations and sections showing the dust confining apron; and Fig. 12 is a reduced bottom plan view of the rotary abrading disk indicating in dotted lines the relatively small segmental area of the disk which comes into momentary abrading contact with the surface being treated.

Figures 5, 6:
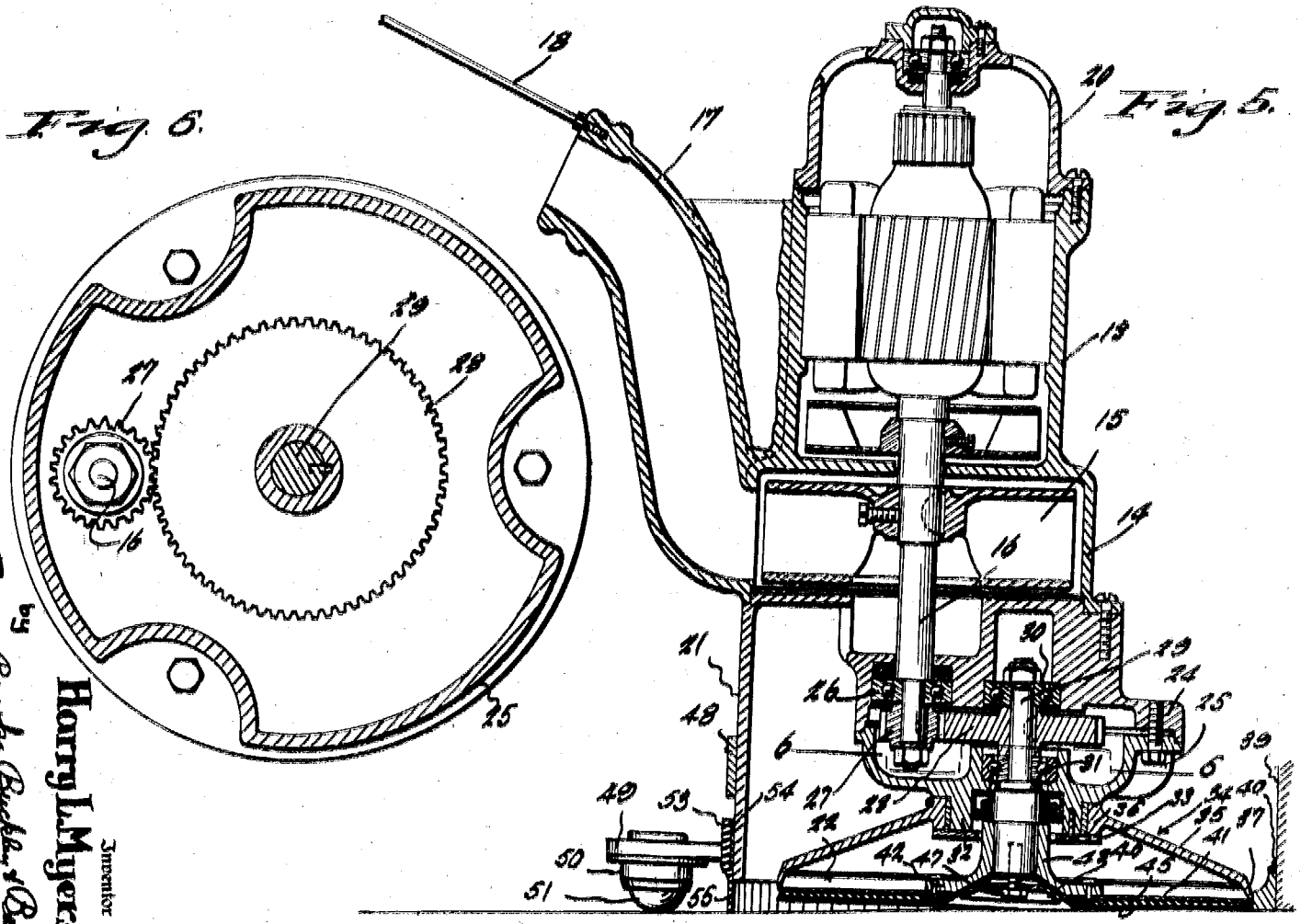
Fig. 5 is a central vertical sectional and elevational view thereof.
Fig. 6 is a horizontal section through the lower portion of the structure.

The machine of my invention is preferably provided with a relatively high speed electric motor and preferably the gears transmitting movement to the rotary disk are driven directly from the motor shaft. In my preferred form, the motor is positioned so that its shaft is provided with friction reducing bearings above and below the motor. The casing of the machine is preferably of relatively small transverse dimensions and the motor is supported substantially above the rotatable disk whereby the weight of the motor and casing is utilized effectively to present the rotatable disk into proper working contact with the surface being treated. The machine is preferably provided with a plurality of handles for facilitating movement or carrying of the machine by the operator and these handles are preferably of relatively great length, of substantial width and are substantially undercut to provide relatively large surfaces for the fingers or hands of the operator. A switch for controlling the operation of the motor may be positioned at or in one of the handles.

The device also preferably includes means surrounding the rotating disk for substantially sealing the body of the machine to the surface to be treated whereby dust or particles removed or abraded from the surface being treated by the disk may be drawn off into a suitable dust collector.

In the drawings, 13 designates a suitable electric motor casing and 14 a lower shell defining a housing for a dust collecting fan 15. This fan is secured to the vertically disposed motor shaft 16 (Fig. 5) and extending from one side of the fan housing is a dust conveying pipe 17 provided with a suspension rod 18 for the dust collecting bag 19 (Fig. 4).

The upper portion of the motor casing is in the form of a removable cap 20 provided with an end thrust bearing for the motor shaft (Fig. 5).

In the form of the invention shown, a hollow casting or skirt 21 is removably bolted to the casing above. This skirt 21 serves as a guard for a rotary abrading disk 22 and its associated details. The front portion of the skirt 21 is open to permit the abrading disk to project therefrom as indicated in Fig. 3, and is shaped as at 23 to provide an intake for dust and dirt.

The skirt 21 is constructed and arranged to deliver the dust into fan housing 14, as shown in Fig. 5.

The skirt 21 is preferably formed with a suitable lip 24 to which a cover 25 is removably bolted, the parts 24 and 25 forming an enclosure for a thrust bearing 26 for the lower end of the motor, a pinion 27 on the motor shaft in mesh with a speed reducing gear 28 carried by a stub shaft 29 mounted for rotation in bearings 30 and 31. The part 25 is provided with a depending neck 32, and 33 designates a retaining washer thereon.

Suitable means are provided as a buffer to engage in non-marring contact with a baseboard or other surface angularly disposed with relation to the surface being treated to guide the machine along the baseboard or other surface and to allow the abrading disk to operate upon the floor or other surface being treated to within a fraction of an inch of the baseboard or angularly disposed part or surface. I have shown one form and arrangement of such a buffer as at 34 in the drawings, wherein 35 designates a downwardly and outwardly inclined angular plate having a collar 36 surrounding the neck 32 and resting on the retaining washer 33. The marginal portion of the plate 35 is provided with a flange 37, the lower portion of which is formed as a feather edge baseboard contacting surface 38 for contact with a baseboard 39 or shoe strip 40.

It is obvious that the buffer according to my invention may assume various forms, so long as it operates to engage a baseboard or surface disposed angularly to the surface being treated in substantial non-marring contact and to space the leading edge of the abrading disk a minimum distance from that angular surface or to interpose between the leading edge of the abrading disk and the baseboard or other surface a minimum thickness of buffer.

In the particular form shown, the buffer 34 is so mounted as to rotate freely on its bearing or part 32 and washer 33 so as to maintain rolling contact with the baseboard or other surface.

In my preferred form, the abrasive tool or disk 22 is formed with a metal backing plate 41 bolted or otherwise secured to an attaching flange 42 carried by a coupling sleeve 43 secured to the stub shaft 29.

The backing plate 41 is of appropriate tensile strength and resiliency to provide the requisite pressure resistant properties. On its underside the backing plate is provided with a covering of rubber, fabric or other material 44 which provides the requisite traction to drive the abrasive disk 45. The abrasive disk is renewable and centrally apertured and held removably in place by a clamping washer 46 which may be secured by a suitable set screw as 47.

Means are provided for mounting the abrasive disk so that only a restricted portion thereof comes into momentary abrading contact with the floor or surface being treated. In the form of the invention shown I achieve this by tilting the casing and assembly. For this purpose I provide an adjustable truck (Fig. 2) in which 48 designates an attaching band, 49 brackets having sockets 50 provided with ball bearings 51. 48a designates adjusting screws for holding the truck in desired position relative to the casing. In the form shown the rear portion of the machine is raised to a desired extent to incline the disk with respect to the surface to be treated with the rollers 51 in contact with the floor or surface, whereupon tightening of the screws 48a secures the rollers in such position.

In Figs. 10 and 11, 53 designates a strip of rubber or suitable fabric carried by an attaching band 54 and having its lower edge portion slit to provide fingers 55. This strip confines material being abraded to permit it to be picked up by the suction fan.

A machine of this kind is small and portable and sometimes handled by the operator while in a stooping position. It is necessary to provide appropriate handles. The numeral 56, Figs. 2 to 4 inclusive, designates the handles provided with hand gripping portions 57 to provide convenient grips for the fingers of the user. 58 designates extension handle portions shaped to provide rests for the hands of the operator. By reason of the fact that the average floor surfacing man is possessed of relatively large hands, the hand grips are large and sturdy so as to permit the operator to partly rest his weight on the webs 48 while securely holding the grips 57 to effectively manipulate the machine.

59 (Fig. 3) designates an electric switch for controlling the operation of the motor.

In abrading the edge of a floor, the machine is regulated when the truck or carriage is set at the desired elevation to tilt the disk to present the desired segment of the abrading disk to the work and then with the electric motor in operation rotating the abrasive disk as the operator holds the machine to the work with the feather edge 38 of the buffer against the wall or shoe, he may roll the machine longitudinally of the wall or shoe effectively sanding to practically the very edge of the floor or other surface.

The abrading disk being placed at right angles to the tool shaft 29 permits portions of the abrading disk to flex and yet to resist undue flexing so as to ensure proper pressure of the abrasive disk against the surface being treated but at the same time allowing it to compensate for rough or hard spots in the floor or surface which might otherwise break the abrasive disk.

I have illustrated and described a preferred embodiment of my invention and it is obvious that parts of the device may take other forms than illustrated within the concept of the invention and the appended claims.

I claim:

1. An edging machine of the class described comprising a vertically elongated motor and casing unit, a substantially vertical shaft mounted for rotation in bearings in said casing unit, operating means for the shaft, a disk-like abrading tool operatively attached to the shaft and disposed in a plane substantially parallel to the work, means on said unit for tilting the support, shaft, and inclining the tool to limit the abrading contact area thereof with the work, an annulus mounted for idling rotation on the casing above the tool and provided with a marginal abutment flange located in close proximity to the edge portion of the tool, said flange having its extreme lower edge portion reduced in dimensions to provide a feather-like edge to rest against the bead or wall-board as the case may be, and to prevent the tool from coming into destructive contact with the bead.

2. An edging machine of the class described comprising a mobile support including a relatively small vertical motor including a shaft provided at its lower end portion with a pinion, a tool shaft mounted for rotation in bearings in said support and occupying a substantially vertical position and parallel to the motor shaft, a relatively large power take-off gear carried by the tool shaft and in mesh with said pinion, a rotary disk abrading tool comprising a flexible backing attached to the lower portion of the tool shaft, a removable abrasive disk associated with the backing, clamping means for holding the disk in position on the tool-shaft, diametrically opposed handles attached to the motor, and a carriage for the support comprising a pair of spaced brackets provided with universally mounted floor contacting balls, a connecting band for said brackets, and means for adjustably securing the band to the support whereby to permit the carriage to be regulated for tilting the entire support, motor shaft, tool shaft and tool, whereby to restrict the abrading area of the abrasive disk to a predetermined limited degree, and an annulus mounted for free rotation on the support above the tool, the annulus being substantially equal in diameter to the tool and formed on its outer edge with a depending marginal flange whose extreme lower edge portion is restricted in dimensions to provide a feather-edge trim contacting surface, said contacting surface projecting slightly beyond an adjacent portion of the tool to prevent said portion from coming into contact with the trim.

3. An edging machine of the class described comprising a vertical motor formed with a fan housing, a casting secured to the fan housing and depending therefrom and provided with a plurality of bearings, said casting being formed to provide a tool guard and dust intake means, a dust bag, and means for connecting the dust bag with the fan housing, a substantially vertical tool shaft mounted for vertical rotation in bearings in said casting, an operating connection between the motor and shaft, an abrading tool comprising a flexible backing disk with traction means on its underside, a renewable abrasive disk, and clamping means for securing the disk to the shaft, an annulus mounted for rotation on said casting and formed with an abutment flange at its outer edge portion to prevent contact of the edge portion of the tool with adjacent wall trimming, diametrically opposite handles secured to the upper portion of the motor, a pair of L-shaped brackets provided with sockets, floor contacting balls mounted in said sockets, means connecting said brackets together in assembled relationship, said means being adjustably connected with the rear portion of the aforesaid casting whereby to permit the entire machine to be tilted to incline the shaft and tool in order to limit the degree of abrading contact of the tool with the floor in the manner described.

4. A hand type rotary disk surfacing machine bodily liftable by the operator and comprising a relatively small vertical motor including a casing formed at its bottom with an annular portion defining a fan housing, a skirt-like casting secured to and depending from the fan housing and having the major portion of its frontal part cut away, said casing and casting being provided with vertically aligned bearings, said motor including a shaft mounted for rotation in said bearings, a dust fan carried by the shaft and located in said fan housing, a rotary disk tool located in said casting and having a predetermined portion of its perimeter protruding through and beyond the cut-away portion of said casting, an operating connection between said tool and shaft, dust intake and collecting means associated with the fan and casting, a pair of diametrically opposed handles secured to the upper portion of said motor casing, and a rolling carriage adjustably mounted on the rear portion of the casting and diametrically opposed to the cut-away frontal portion thereof and adapted to tilt the motor, casing and tool for the purposes described.

5. A high speed manually liftable and portable machine of the spinner type comprising a relatively small vertically disposed light weight motor and casing therefor, the motor casing being provided at its lower portion with an annular shell defining a fan housing, a hollow casting secured to and depending from the fan housing and embodying a skirt-like portion whose front is open, said skirt-like portion being enlarged on one side and gradually tapered rearwardly to define a dust intake nozzle, said casting being in open communication with said fan housing, dust collection means connected with the fan housing, said casting and casing being provided with shaft bearings, said motor including a shaft mounted for rotation in said bearings or the lower end of the shaft depending into said casting, a rotary disk tool attached to the lower end of the shaft, an annulus mounted for idling rotation above the tool and provided with a marginal abutment flange located in close proximity to the edge portion of the tool, the annulus and tool protruding through and beyond the open front portion of said casting, the dust intake nozzle being located on a predetermined side of the tool to facilitate delivery of dust into the nozzle, a pair of diametrically opposed lifting and pressure producing handles attached to the motor casing and located in substantial vertical alignment with the dust intake nozzle, a roller equipped carriage adjustably secured to the rear portion of the casting and diametrically opposed to the open frontal portion of said casting, said carriage being designed to facilitate handling of the machine and to tilt the tool to restrict the area of contact of the protruding portion of said tool.

6. A high speed manually liftable and portable surfacing machine comprising a casing including a self-contained electric motor, a substantially vertical tool shaft mounted for rotation in bearings in said casing and operatively connected with said motor, a disk-like abrading tool operatively attached to the lower end of the shaft and disposed in a plane substantially parallel to the work, means mounted on the casing and adapted for movable contact with the work, said means having a definite fixed position with respect to said casing to incline said shaft with respect to the work and to tilt a predetermined limited portion of the abrading tool into restricted contact with the work, and an annulus mounted for idling rotation on the casing in close proximity to the abrading tool and provided with a marginal abutment flange co-operable with the peripheral portion of the tool, said flanged annulus constituting a revolving surface-protecting guard as well as a friction reducing endless track when said flange is pressed against the adjacent surface.

7. A high speed manually liftable and portable disk surfacing machine of the spinner type comprising a vertically elongated casing embodying a self-contained electric motor, a substantially vertical tool shaft mounted for rotation in bearings in said casing and operatively connected with said motor, a resilient compensating surfacing tool attached to said tool shaft and disposed at approximate right angles to the axis of said shaft and adapted to assume a somewhat parallel position with respect to the surface being treated, a machine tilting swivel roller-equipped truck fixedly attached to the rear lower portion of said casing in a position to permit the rollers to rest on the surface being treated and adapted to angle and press a restricted sector of the diametrically opposite frontal portion of the disk into abrading contact with said surface, said frontal portion of the disk constituting the sole means for supporting the frontal portion of said machine from the surface, and a revoluble guard mounted for idling rotation on the casing and having its marginal portion co-ordinated with the corresponding portion of said disc and adapted to bear against a surface at right angles to said first-named surface.

8. A high speed manually liftable and portable disk surfacing machine of the spinner type comprising a vertically elongated casing embodying a self-contained electric motor, a substantially vertical tool shaft mounted for rotation in bearings in said casing and operatively connected with said motor, a resilient compensating surfacing tool attached to said tool shaft and disposed at approximate right angles to the axis of said shaft and adapted to assume a somewhat parallel position with respect to the surface being treated, a machine tilting swivel roller-equipped truck fixedly attached to the rear lower portion of said casing in a position to permit the rollers to rest on the surface being treated and adapted to angle and press a restricted sector of the frontal portion of the disk into abrading contact with said surface, said frontal portion of the disk constituting the sole means for supporting the frontal portion of said machine on the surface, and a revoluble guard mounted for idling rotation on the casing and having its marginal portion coordinated with the corresponding portions of said disk and adapted to bear against a surface at right angles to said first-named surface, and a pair of diametrically opposed carrying and pressure-producing handles attached to opposite sides of the upper portion of said casing in the manner and for the purposes described.

9. A surfacing machine of the class described comprising a casing provided with a motor and formed with an annular shell defining a fan housing, a hollow casting secured to the fan housing and embodying a skirt-like portion whose front is open, said skirt-like portion being enlarged at one side adjacent the surface being treated and tapered rearwardly to define a dust intake nozzle, said casting and nozzle being in open communication with said fan housing, dust collecting means connected with the fan housing and adapted to accommodate a dust-collecting bag, said motor including a shaft extending through said fan housing, a fan on the shaft located in said housing, and a rotary disk surfacing tool operatively connected with the motor shaft and located in said casting and protruding through and beyond the open front portion of the casting in a position to facilitate sweeping of the dust into the nozzle when the tool is in operation.

10. A high speed discoidal type edging machine comprising a portable manually liftable support embodying a power driven tool shaft, a rotary discoidal abrading tool operatively connected with said shaft and adapted to occupy a plane substantially parallel to the floor, means rigidly mounted on the support for movable contact with the surface, said means having a definite position on the rear side of the support diametrically opposite to that portion of the surface being treated, said means serving to elevate the rear end of the support and to tilt the abrading tool so that a restricted area of that portion diametrically opposite to said means retains shaving contact with the surface, and a guard co-operable with the marginal portion of the tool, said guard being adapted to be pressed against the washboard in the manner and for the purposes described.

11. A surface edging device of the class described comprising a portable support, a power shaft mounted for rotation in bearings in said support, a surface conditioning disk operatively connected to said shaft, anti-friction means supported for independent rotation adjacent said surface conditioning disk, said means being arranged above the disk and having its outer marginal portion relatively and freely movable with respect to the edge portion of the disk in a manner to permit said means to be pressed and held firmly against an adjacent right-angularly disposed surface while the disk is maintained in contact with the surface being treated to space the edge of the disk from the first-named surface and to facilitate stabilization and expeditious handling of the disk while it is moved longitudinally of the latter surface and held firmly down against the second-named surface, and a roller equipped truck attached to the rear lower portion of the support and adapted for constant contact with the surface being treated, said truck serving to elevate the rear portion of the support and to simultaneously tilt the disk so that the diametrically opposite frontal portion thereof has fixed limited abrading contact with the surface being treated.

12. A portable hand type rotary disk surface conditioning machine bodily liftable and controllable by the operator comprising a motor, a casing therefor formed with an annular portion constituting a fan housing, a skirt-like part carried by said housing and having a predetermined section of its rim cut away at the frontal side of the machine, a fan mounted in said housing and operatively connected with said motor, a rotary surfacing disk located in said casting and having a predetermined portion of its perimeter protruding through and beyond the cut-away portion of said rim, said disk being operatively connected with said motor, carrying and steering means connected to said motor casing, stabilizing and guiding means rigidly mounted on the casing for movable contact with the surface being treated, said means having a predetermined fixed position on the rear side of the casing diametrically opposite to the projecting perimeter portion of said rotary disk and serving to elevate the adjacent end of said casing, to space the major portion of the disk from the surface and to tilt a restricted area of the front protruding portion into shaving contact with the surface.

13. A portable hand type rotary disk surface conditioning machine bodily liftable and controllable by the operator comprising a motor, a casing therefor formed with an annular portion constituting a fan housing, a skirt-like part carried by said housing and having a predetermined section of its rim cut away at the frontal side of the machine, a fan mounted in said housing and operatively connected with said motor, a rotary surfacing disk located in said casting and having a predetermined portion of its perimeter protruding through and beyond the cut-away portion of said rim, said disk being operatively connected with said motor, a pair of carrying and steering handles connected to said motor casing, stabilizing and steering means rigidly mounted on the casing for movable contact with the surface being treated, said means having a predetermined fixed position on the rear side of the casing diametrically opposite to the projecting perimeter portion of said rotary disk and serving to elevate the adjacent end of said casing, to space the major portion of the disk from the surface and to tilt a restricted area of the front protruding portion into shaving contact with the surface, a dust discharge pipe connected with and extending angularly from the fan housing at a point between the handles, said pipe being adapted to support and deliver dust from the fan housing into an associated dust collecting bag.

14. A light weight high speed discoidal surfacing machine of the portable hand type bodily liftable and controllable by the operator, said machine comprising a support embodying a self-contained motor-driven tool shaft, a rotary disk abrading tool operatively connected with the working end of said shaft and disposed in a plane at right angles to the longitudinal axis of the shaft and adapted to occupy a plane substantially parallel to the surface being treated, machine tilting means attached to the rear lower portion of the support within the vicinity of the surface being treated, said means serving to tilt the disk with respect to the surface so that the major rear and side portions of said disk are spaced from the surface and only a limited sector of the front portion of the disk is forced into abrading contact with the surface, said contacting sector of the disk and said tilting means being disposed substantially opposite to each other and being the only points of the machine in direct movable contact with the surface, said supporting means embodying guard means for the disk, and also embodying a self-contained automatically operable dust collecting means, and handling means attached to the support to facilitate its movement and to aid in steering it.

HARRY L. MYERS.